(12) United States Patent
Balasus et al.

(10) Patent No.: US 11,680,751 B2
(45) Date of Patent: *Jun. 20, 2023

(54) STACKED-PLATE HEAT EXCHANGER

(71) Applicant: Mahle International GmbH, Stuttgart (DE)

(72) Inventors: Lars Balasus, Freiberg (DE); Matthias Erler, Freiberg (DE); Bernheim Goehler, Freiberg (DE); Steffen Groezinger, Vaihingen (DE); Thomas Hell, Weissenborn (DE); Volker Velte, Oetisheim (DE); Andreas Wagner, Bobritzsch-Hilbersdorf (DE)

(73) Assignee: Mahle International GmbH

( * ) Notice: Subject to any disclaimer, the term of this patent is extended or adjusted under 35 U.S.C. 154(b) by 236 days.

This patent is subject to a terminal disclaimer.

(21) Appl. No.: 16/924,168

(22) Filed: Jul. 8, 2020

(65) Prior Publication Data

US 2020/0340750 A1 Oct. 29, 2020

Related U.S. Application Data

(63) Continuation of application No. 15/770,189, filed as application No. PCT/EP2016/074337 on Oct. 11, 2016, now Pat. No. 10,852,067.

(30) Foreign Application Priority Data

Oct. 21, 2015 (DE) .......................... 102015220579.7

(51) Int. Cl.
  *F28D 9/00* (2006.01)
  *F28F 3/10* (2006.01)
  *F28D 21/00* (2006.01)

(52) U.S. Cl.
  CPC ................ *F28D 9/005* (2013.01); *F28F 3/10* (2013.01); *F28D 9/0037* (2013.01);
  (Continued)

(58) Field of Classification Search
  CPC ...... F28D 9/005; F28D 9/0075; F28D 9/0043; F28D 9/0037; F28D 2021/0082; F28D 1/0375; F28D 1/0325; F28D 1/0333
  See application file for complete search history.

(56) References Cited

U.S. PATENT DOCUMENTS 4,653,581 A * 3/1987 Yogo ..................... F28D 9/0075
                                                 165/166
4,872,578 A * 10/1989 Fuerschbach ........... F28D 9/005
                                                 165/166
(Continued)

FOREIGN PATENT DOCUMENTS

DE   19511991 A1   10/1996
DE   29616354 U1   1/1997
(Continued)

OTHER PUBLICATIONS

English abstract for DE-102010036664.
English abstract for EP-0742418.

*Primary Examiner* — Jianying C Atkisson
*Assistant Examiner* — For K Ling
(74) *Attorney, Agent, or Firm* — Fishman Stewart PLLC

(57) ABSTRACT

A stacked-plate heat exchanger may include a plurality of stacked plates. The plurality of stacked plates may include a plurality of first stacked plates and a plurality of second stacked plates stacked alternately one on top of another. Pairs of adjacent stacked plates may each delimit one of a first cavity for the passage of a first fluid and a second cavity for the passage of a second fluid in an alternating manner. The heat exchanger may also include a support structure that may support the plurality of stacked plates in an edge region to stabilize the second cavity. The plurality of stacked plates may each include a first opening and at least two second openings arranged around the first opening. The heat exchanger may also include a plurality of webs each (Continued)

arranged between two adjacent second openings. The plurality of webs may form the support structure.

18 Claims, 7 Drawing Sheets

(52) U.S. Cl.
CPC .... *F28D 9/0062* (2013.01); *F28D 2021/0082* (2013.01); *F28F 2225/04* (2013.01); *F28F 2240/00* (2013.01); *F28F 2280/00* (2013.01)

(56) References Cited

U.S. PATENT DOCUMENTS

| | | | | |
|---|---|---|---|---|
| 5,184,673 | A * | 2/1993 | Hedman | F28D 9/0075 228/183 |
| 5,435,383 | A | 7/1995 | Rajagopal | |
| 5,845,706 | A * | 12/1998 | Gruner | F28F 9/0221 165/177 |
| 5,931,219 | A | 8/1999 | Kull et al. | |
| 6,968,892 | B1 * | 11/2005 | Symonds | F28D 9/0075 165/165 |
| 8,393,384 | B2 | 3/2013 | Velte et al. | |
| 9,557,116 | B2 | 1/2017 | Velte | |
| 2008/0066895 | A1 * | 3/2008 | Wegner | F28F 9/0282 165/167 |
| 2009/0126911 | A1 | 5/2009 | Shore et al. | |
| 2012/0168112 | A1 * | 7/2012 | Scott | F28F 3/02 165/185 |
| 2013/0126137 | A1 * | 5/2013 | Velte | F28D 1/0333 165/167 |

FOREIGN PATENT DOCUMENTS

| | | |
|---|---|---|
| DE | 102005044291 A1 | 3/2007 |
| DE | 112008003077 T5 | 9/2010 |
| DE | 102010028660 A1 | 11/2011 |
| DE | 102010036664 A1 | 2/2012 |
| EP | 0183398 A1 | 6/1986 |
| EP | 0742418 A2 | 11/1996 |

* cited by examiner

STACKED-PLATE HEAT EXCHANGER

CROSS-REFERENCE TO RELATED APPLICATIONS

This application is a Continuation of U.S. patent application Ser. No. 15/770,189, filed on Apr. 20, 2018, which claims priority to International Patent Application No. PCT/EP2016/074337, filed on Oct. 11, 2016, and German Patent Application No. DE 10 2015 220 579.7, filed on Oct. 21, 2015, the contents of each of which are hereby incorporated by reference in their entirety.

TECHNICAL FIELD

The invention relates to a stacked-plate heat exchanger, in particular a charge air cooler, comprising multiple stacked plates stacked one on top of the other, a respective first stacked plate and a respective second stacked plate being stacked alternately one on top of the other in a stacking direction, wherein each stacked plate has a rim running around its periphery and extending in a stacking direction wherein at least the rims of each pair of adjacent stacked plates lie against each other, wherein the respective pairs of adjacent stacked plates delimit a first cavity for the passage of a first fluid or a second cavity for the passage of a second fluid, said first cavities and second cavities alternating in the stacking direction.

BACKGROUND

Such stacked-plate heat exchangers are used for example in charge air coolers. Here, charge air which is to be cooled is directed through the first cavity and a coolant is directed through the second cavity. Therefore, respectively the charge air lies on one side and the cooling medium on the other side against the inner stacked plates. Thereby, the charge air flowing through the stacked-plate heat exchanger can be cooled very effectively by the coolant.

Due to the type of construction, through the reciprocal supporting at the rims, a supporting of the stacked plates against one another is liable to deviations on the stacked plates owing to manufacture. Small radial deviations of the position of the rims can lead to a greater displacement of the distance of the stacked plates with respect to one another in the stacking direction, so that either the cavities are not sufficiently large or the stacked plates are not sufficiently sealed with respect to one another at the rims.

From DE 10 2005 044 291 A1 a stacked-plate heat exchanger is known, comprising multiple elongated plates, stacked one on top of the other and connected, in particular soldered, to one another, which delimit a cavity for the passage of a medium which is to be cooled in longitudinal direction of the plates, and a further cavity for the passage of a coolant.

From EP 1 083 398 A1 a stacked-plate heat exchanger is known, in which a turbulence insert is inserted in the cavities, which can be formed for example by a corrugated metal sheet, and which improves the heat transmission from the coolant or from the medium which is to be cooled to the respective stacked plates.

From DE 11 2008 003 077 T5 a stacked-plate heat exchanger is likewise known, however, the latter does not have an extended rim, so that an additional housing is required for the sealing.

SUMMARY

The present invention is based on the problem of providing an improved or at least different embodiment for a stacked-plate heat exchanger, or respectively a charge air cooler or an internal combustion engine with such a stacked-plate heat exchanger, which is distinguished in particular by a stabilizing of the cavities between the stacked plates.

This problem is solved according to the invention by the subject matter of the independent claim(s). Advantageous further developments are the subject matter of the dependent claim(s).

The invention is based on the general idea of providing a support structure, which stabilizes the distance, measured in the stacking direction, of the individual stacked plates with respect to one another. For this, it is expedient that the stacked-plate heat exchanger has a support structure which mutually supports the stacked plates in the stacking direction in an edge region of the stacked plates, in order to stabilize the first cavity or the second cavity between the stacked plates. Through the support structure, therefore, the setting dimension of the stacked plates in the stacking direction is additionally limited. Deviations, in particular in the plate length and/or width and or in the angle of the extended rims, thereby have only a very small influence on the distance arising between the stacked plates. Thereby, the tightness and the stability of the stacked-plate heat exchanger can be improved.

A favourable possibility makes provision that the support structure does not seal the cavity. Through the fact that the support structure does not have to seal the respective cavity, freedoms result in the configuration of the support structure, which can be utilized to form a favourably priced and effective support structure.

A further favourable possibility makes provision that the support structure is different from the rims of the stacked plates. Owing to the steep angle of the rims to the stacked plates, small deviations in the angle or in the length or width of the stacked plates lead to an intensive displacement of the support point. Consequently, a support structure which is based solely on the configuration of the rims would not be sufficient in order to enable a satisfactory support of the distance of the stacked plates with respect to one another.

An advantageous solution makes provision that the stacked plates at end regions lying in longitudinal direction have respectively a first opening for the first fluid and respectively at least one, preferably at least two, second openings, arranged around the first openings, for the second fluid. The openings formed in the stacked plates therefore penetrate in stacking direction the entire stacked-plate heat exchanger. Consequently, the respective fluid can flow through the openings into the respectively associated cavities. Through suitable forming of the stacked plates, fluid which flows through the first openings into the stacked-plate heat exchanger can only flow into the first cavities, and fluid which flows through the second openings into the stacked-plate heat exchanger can only flow into the second cavities. The first cavities, formed between the stacked plates, and the second cavities are arranged fluidically respectively parallel to one another, and are therefore flowed through in a parallel manner by the respective fluid. Thereby, two fluid passages are formed in the stacked-plate heat exchanger, which are separate from one another, so that the coolant and the medium which is to be cooled do not mix with one another.

A further advantageous solution makes provision that in a region of the at least one second opening between the stacked plates at least a portion of the second cavity is formed, and that the support structure is arranged in the region of the at least one second opening. The second openings lie in the edge region of the stacked plates. In this edge region, respectively between two stacked plates there are alternately a large distance, which forms the second cavity, and no distance, therefore stacked plates lying one on top of the other. Through the large distance between the stacked plates in the edge region, the stabilizing effect by the extended rims is very small. Therefore, the effect of a support structure arranged in the region of the at least one second opening is particularly great.

A particularly advantageous solution makes provision that the stacked plates are formed such that a stacked plate, in a region of the at least one second opening, has a distance with respect to a first adjacent stacked plate, and lies against another second adjacent stacked plate, lying on the opposite side. In this way, between respectively two stacked plates in the region of the second openings either the second cavity is at least partially formed, or an effective supporting exists of the stacked plates, lying one on top of the other, with respect to one another. Thereby, it is sufficient that the support structure is arranged only in the second cavity between the stacked plates, in order to stabilize it.

A favourable variant makes provision that the distance of the adjacent stacked plates is defined by the support structure. The support structure can be configured such that a desired defined distance arises between the stacked plates, so that the required height of the respective cavities can be maintained.

A particularly favourable variant makes provision that the stacked plates have respectively at least two second openings for the second fluid, arranged around the first openings, that webs are formed between the second openings, and that at least some of the webs are stamped, in order to form the support structure. Through the stamping of the webs, these project into the respective second cavity and lie against the stamped webs of the adjacent stacked plate. Consequently, in this manner, a support is provided between the two stacked plates.

A particularly favourable variant makes provision that every other web between the second openings is stamped. Therefore, the webs which are not stamped can rest against the stacked plates lying on the opposite side. Therefore, the stacked plates are sufficiently supported in both directions respectively against the adjacent stacked plate.

An advantageous possibility makes provision that the support structure is formed by at least one insert part which is inserted into the second cavity in a region of the at least one second opening. The insert part can bridge the distance between the respective stacked plates in the region of the at least one second opening, so that the at least one insert part lies against the two respective stacked plates. Therefore, the respective stacked plates can not move closer to one another, so that a sufficient support is provided by the insert part between the stacked plates.

A particularly advantageous possibility makes provision that the insert part is configured substantially in the form of a half ring, wherein on an inner side a plurality of inwardly projecting fingers are arranged for the segmenting of the at least one second opening. An insert part in the form of a half ring has the advantage that the position of the insert part is stabilized within the second cavity and therefore the supporting effect of the insert part is ensured. It shall be understood that in each end region of the stacked plates respectively at least one insert part is inserted. Therefore, both end regions of the stacked plates can be stabilized by the support structure.

A favourable solution makes provision that the support structure is formed by multiple, for example eight, insert parts, which are inserted into the second cavity in a region of the at least one second opening, and that the insert parts are configured cylindrically. Insert parts which are shaped in such a manner are extremely favourable to produce, so that the support structure can be produced at a favourable cost.

A particularly favourable solution makes provision that the support structure is formed by at least one cam, which in the case of one type of the stacked plates is formed into the peripheral rim. Thereby, the supporting effect of the extended rims is improved, because the stacked plate arranged above the respective stacked plate can not slip over the cams on the rim of the stacked plate. Therefore, the cam blocks a further slipping together of the stacked plates and therefore supports the two stacked plates with respect to one another.

An advantageous variant makes provision that the at least one cam is directed inwards. Thereby the stacked plate, following in the stacking direction, which lies against the inner side of the extended rim, can be blocked by the cam, so that this stacked plate can rest against the cams.

A particularly advantageous variant makes provision that, viewed in the stacking direction, the first cavities lie respectively over one of the first stacked plates, and that the second cavities lie respectively over one of the second stacked plates. Thereby, the first cavities and the second cavities can be separated from one another fluidically in an excellent manner.

In the description and in the enclosed claims, "over, viewed in the stacking direction" means that an element which, viewed in the stacking direction, is over another element, is arranged offset in stacking direction with respect to the other element. Accordingly, an element which, viewed in the stacking direction, is under another element, is arranged offset contrary to the stacking direction with respect to the other element.

A further favourable solution makes provision that the cams are formed in the rim of the second stacked plates. Therefore, the cams can prevent a slipping off of the first stacked plates and can therefore stabilize the second cavities in the region of the second openings of the stacked plates.

A further particularly favourable solution makes provision that the first fluid and the second fluid are directed in opposite flow directions through the stacked-plate heat exchanger. Therefore, a heat exchanger with counter-flow principle is formed, which enables a very effective heat exchange between these two media.

In addition, the invention is based on the general idea of equipping a charge air cooler with such a stacked-plate heat exchanger according to the above description, wherein charge air of a charging arrangement is directed as first fluid through the first cavities, and wherein a cooling medium, for example cooling water, is directed as second fluid through the second cavities. Therefore, the heat can be transmitted from the charge air extremely effectively to the cooling water, so that a cooling of the charge air is made possible. In addition, the advantages of the stacked-plate heat exchanger are therefore transferred to the charge air cooler.

Furthermore, the invention is based on the general idea of equipping an internal combustion engine with a charging arrangement with a charge air cooler according to the above description, wherein charge air of the charge air arrangement is cooled by the charge air cooler. Therefore, the advantages of the stacked-plate heat exchanger and of the charge air cooler are transferred to the internal combustion engine, to the above description of which reference is made in this respect.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
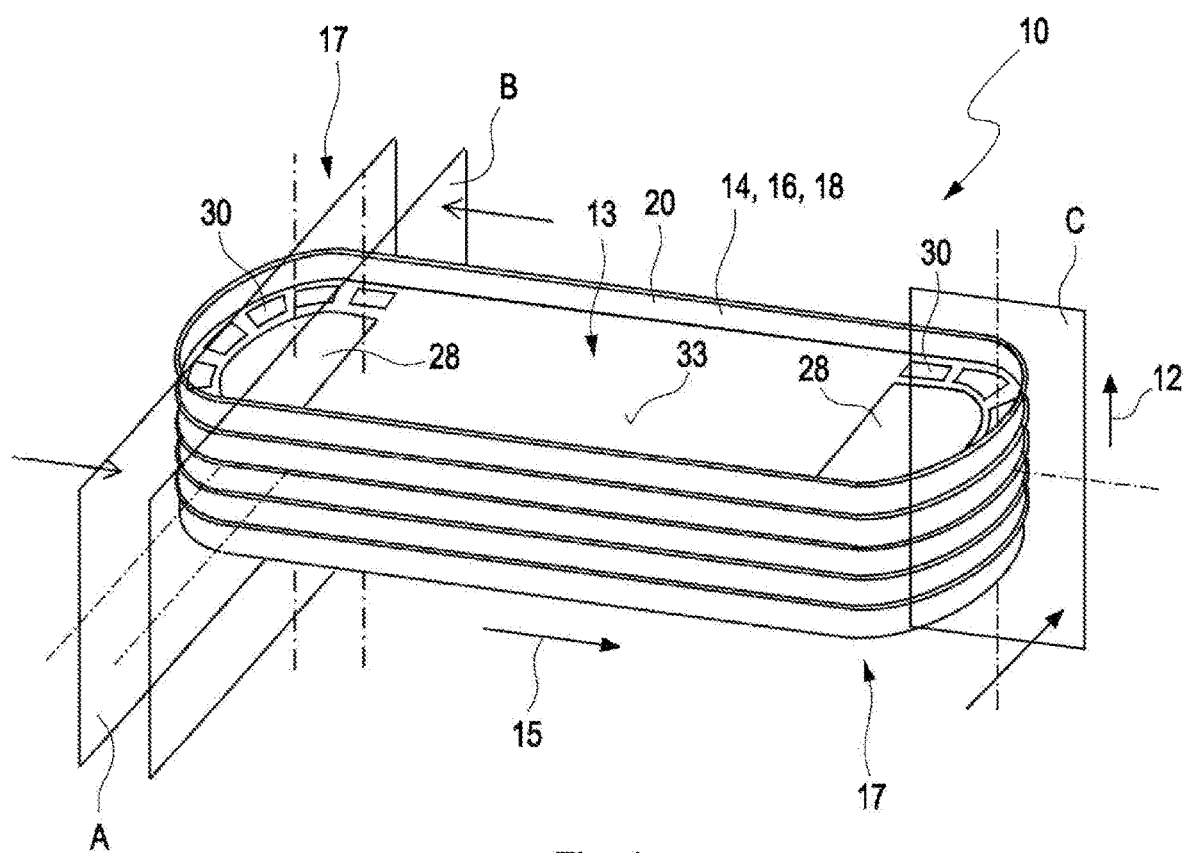
FIG. 1 a perspective view of a stacked-plate heat exchanger.
Figure 2:
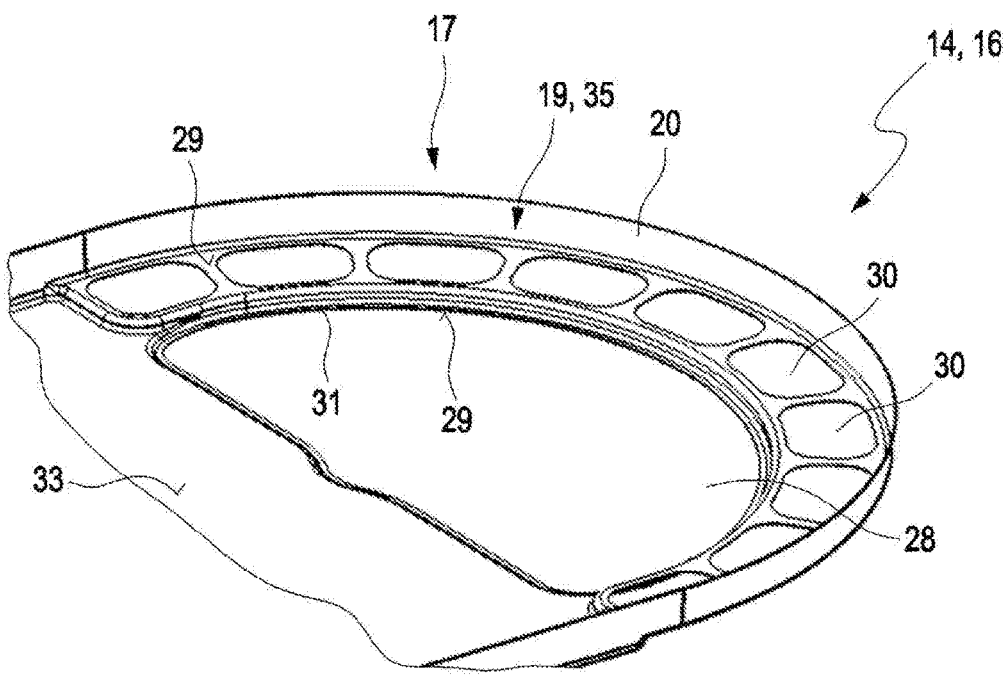
FIG. 2 a perspective illustration of an end region of a first stacked plate.
Figure 3:
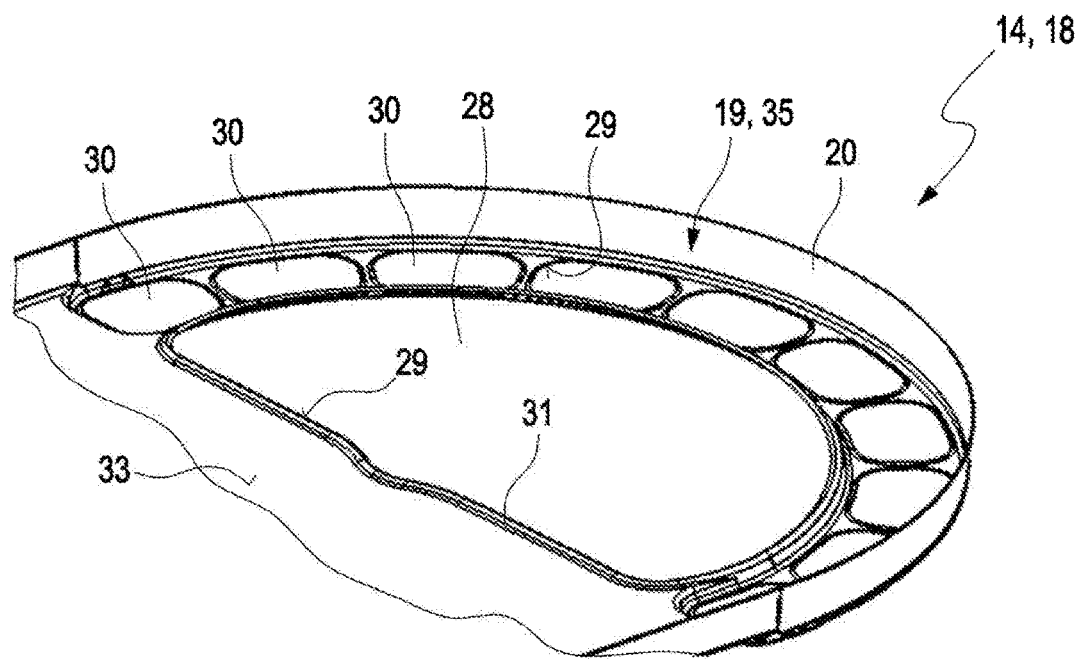
FIG. 3 a perspective view of an end region of a second stacked plate.

A first embodiment of a stacked-plate heat exchanger 10 illustrated in FIGS. 1 to 6 is used in a charge air cooler for a supercharged internal combustion engine. The stacked-plate heat exchanger 10 has multiple stacked plates 14 stacked one on top of the other in a stacking direction 12. Here, the stacked-plate heat exchanger 10 has two types of stacked plates 14, namely first stacked plates 16 and second stacked plates 18. The stacked plates 14 have a rim 20 running around their periphery and extending in the stacking direction 12. Between the stacked plates 14, cavities 22 are formed, wherein first cavities 24 and second cavities 26 alternate in stacking direction 12. In addition, the stacked plates 14 have first openings 28, which are arranged in an end region 17 of the stacked plates 14 lying in longitudinal direction 15, and second openings 30 which are arranged in the edge regions, for example in a semi-circular manner around the first openings 28. A central region 13 lies between the two end regions 17.

The stacked plates 14 are stamped additionally to the extended rims 20, in order to form the cavities 22 between the stacked plates 14. For example, the first stacked plate 16, in a region 19 of the at least one second opening 30 is raised in the stacking direction with respect to a base surface 33 in the central region 13 of the first stacked plate 16. Accordingly, in the case of the second stacked plates 18, the region 19 of the at least one second opening 30 is lowered contrary to the stacking direction 12. On stacking of the stacked plates 14, wherein alternately first stacked plates 16 and second stacked plates 18 are stacked one on top of the other, the stacked plates 14 lie against one another in the region 19 of the at least one second opening 30, when a second stacked plate 18 lies over a first stacked plate 16. Accordingly, the stacked plates 14 form a distance with respect to one another in the region 19 of the at least one second opening 30, when a first stacked plate 16 is arranged over a second stacked plate 18 and therefore form there at least partially the second cavity 26.

Preferably, sealing faces 29 are formed at the regions 19 of the at least one second opening 30 around the at least one second opening 30, which sealing faces lie against sealing faces 29 of the adjacent stacked plates 14. Thereby, the second openings 30 are sealed with respect to the first cavities 24.

The first openings 28 have a peripheral extended rim 31, which is extended from the base surface 33 of the stacked plates 14 in a direction which is opposed to the direction in which the respective regions 19 of the at least one second opening 30 rise. In the case of the first stacked plates 16, the rims 31 of the first openings 28 are extended contrary to the stacking direction 12 and in the case of the second stacked plates 18, the rims 31 of the first openings 28 are extended in the stacking direction 12. Here, the height of the rim 31 of the first openings 28 is smaller than the elevation of the region 19 of the at least one second opening 30. Thereby, the second cavities 26 extend from the region of the second openings 30 along the entire length of the stacked-plate heat exchanger 10 between the second stacked plates 18 and the first stacked plates 16 lying thereabove.

The rims 31 of the first openings 28 of two adjacent stacked plates 14 lie against one another. Preferably, sealing faces 29 are formed at the rims 31. The sealing faces 29 seal the first openings 28 against the second cavities 26.

In addition, through the elevation in the region of the second openings 30, it results that between the first stacked plates 16 and the second stacked plates 18 lying thereabove, over the entire length of the stacked-plate heat exchanger 10 respectively one of the first cavities 24 is formed, which has a greater height in the central region of the stacked-plate heat exchanger 10 than the second cavities 26.

Figure 4:
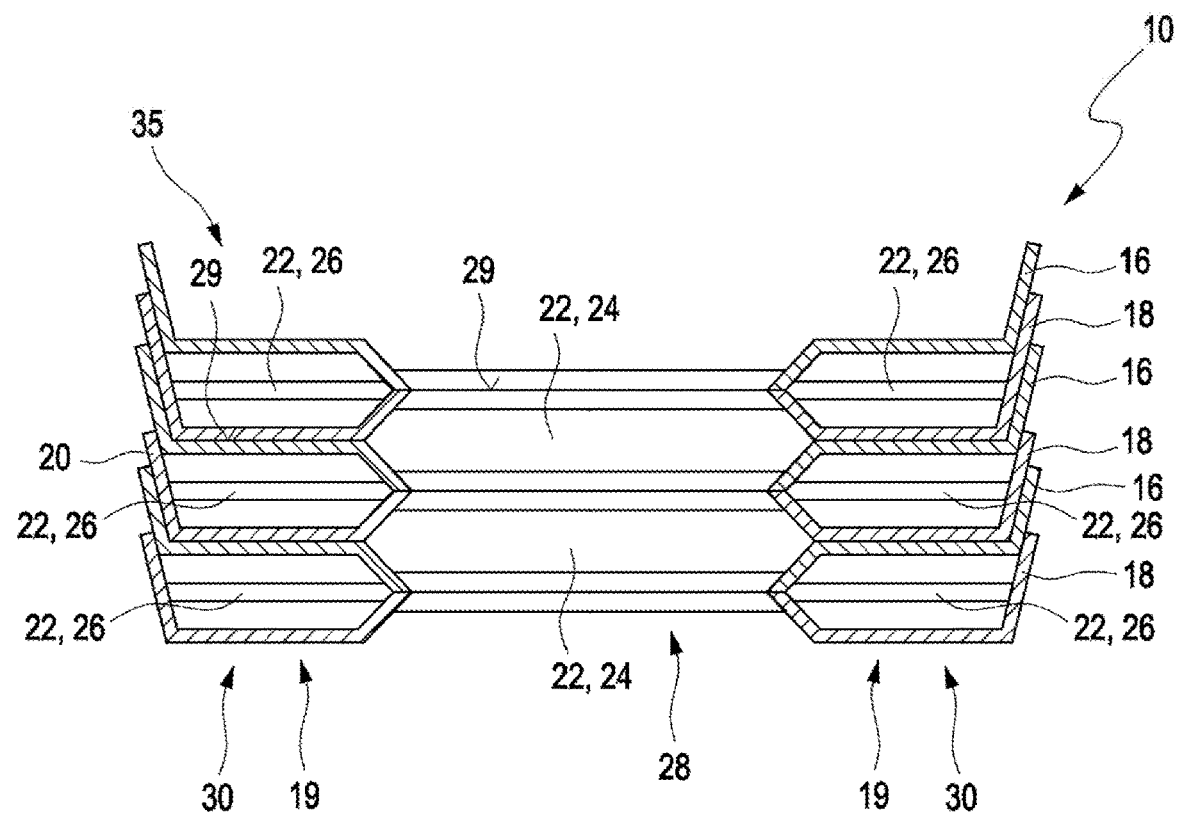
FIG. 4 a sectional illustration through the stacked-plate heat exchanger along the section plane A of FIG. 1, FIG. 5 a section plane through the stacked-plate heat exchanger through the section plane B of FIG. 1, FIG. 6 a sectional illustration through the stacked-plate heat exchanger along the section plane C of FIG. 1, FIG. 7 a perspective view of an end region of a second stacked plate with another inserted insert element according to a second embodiment, FIG. 8 a perspective illustration of the insert element of FIG. 7, FIG. 9 a perspective illustration of a first stacked plate according to a third embodiment, FIG. 10 a perspective illustration of an end region of a second stacked plate according to the third embodiment, FIG. 11 a sectional illustration through a stacked-plate heat exchanger according to the third embodiment along a section plane corresponding to plane C of FIG. 1, FIG. 12 a perspective illustration of an end region of a second stacked plate according to a fourth embodiment, and FIG. 13 a sectional illustration through a stacked plate heat exchanger according to the fourth embodiment along a section plane corresponding to plane C of FIG. 1.
Figure 5:
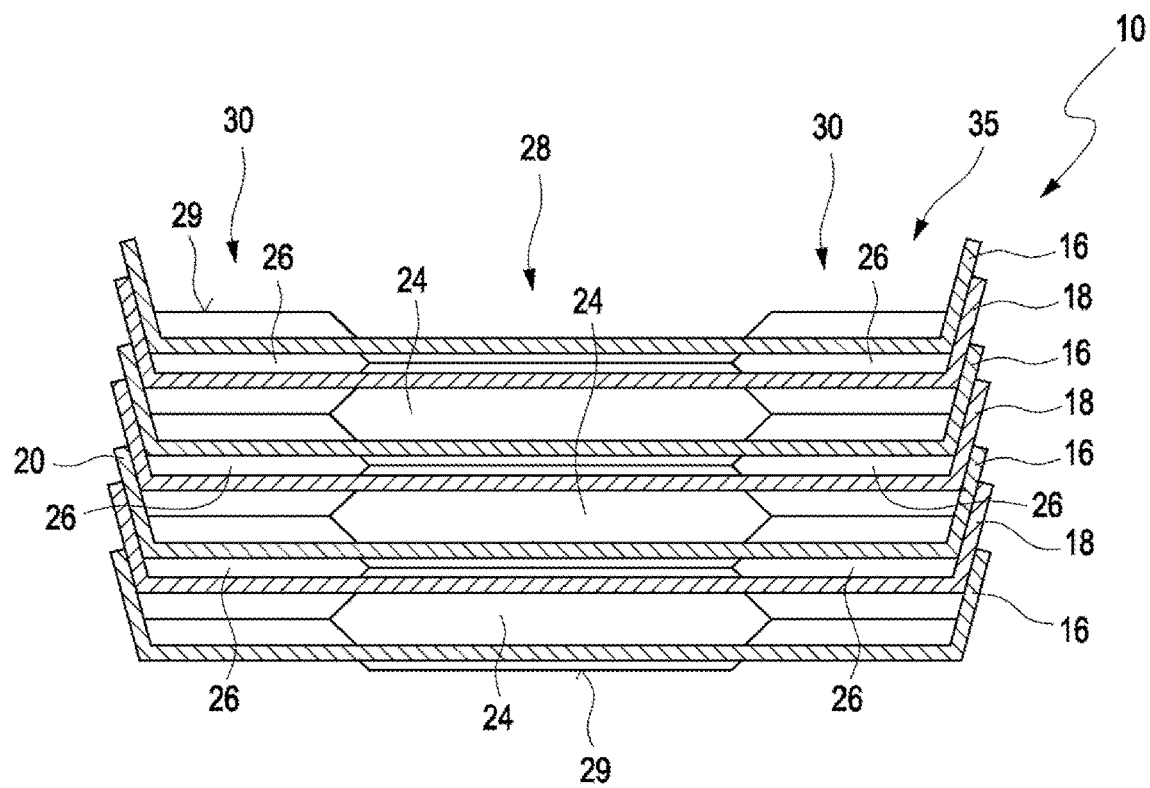

In the sectional illustration of FIG. 4, it can be seen that the second cavities 26 in the region of the second openings 30 have a greater height and taper towards the central region 13. Accordingly, the first cavities 24 also taper towards the central region 13 of the stacked-plate heat exchanger 10. This lies in that in the end regions 17 the first cavities 24 or respectively the second cavities 26 are arranged separated laterally from one another, and therefore do not have to share the height between the stacked plates 14. In contrast thereto, the first cavities 24 and the second cavities 26 in the central region 13 of the stacked-plate heat exchanger 10 are separated from one another in stacking direction 12 and extend instead over the entire surface of the central region 13 of the stacked-plate heat exchanger 10. Therefore, the first cavities 24 and the second cavities 26 taper respectively from the end regions 17 towards the central region 13.

Two fluid passages, separated fluidically from one another, are formed in the stacked-plate heat exchanger 10. A first fluid passage is formed through the first cavities 24 and a second fluid passage is formed through the second cavities 26. These fluid passages are in thermal contact with one another via the stacked plates 14, so that a heat exchange exists between the two fluid passages. In operation, preferably a first fluid, for example charge air, is directed through the first cavities 24 and a second fluid, for example a coolant, is directed through the second cavities 26. Preferably, the through-flow takes place in the opposite direction, so that a counter-flow arrangement exists, and thereby the heat can be exchanged particularly effectively between the first fluid and the second fluid.

The first openings 28 are in fluidic connection with the first cavities 24, and the second openings 30 are in fluidic connection with the second cavities 26. Via the first openings 28 the first fluid can be directed through the first cavities 24. Via the second openings 30 the second fluid can be directed through the second cavities 26.

The stacked plates 14 lie against one another in the end regions 17 of the stacked plates 14 in the region 19 of the at least one second opening 30, however only when the second stacked plate 18 is arranged above a first stacked plate 16. When a first stacked plate 16 lies over a second stacked plate 18, there is only an insufficient support between the stacked plates 14 in the end region 17 of the stacked plates 14. Thereby, the stacked-plate heat exchanger 10 can be compressed at the end regions 17 in stacking direction 12, whereby a mounting of the stacked-plate heat exchanger 10 is impeded. In addition, leaks can arise thereby.

In order to stabilize a distance between the stacked plates 14 in the region 19 of the at least one second opening 30, a support structure 32 is provided, which stabilizes the distance between the stacked plates 14, in particular between second stacked plates 18 and first stacked plates 16, which are arranged respectively over one of these second stacked plates 18.

Alternatively or additionally hereto, provision can be made that the support structure 32 is arranged in an edge region 35 of the stacked plates 14. The edge region 35 runs adjoining the peripheral rim 20 of the stacked plates 14. Therefore, the support structure 32 can also support the stacked plates 14 with respect to one another outside the end regions 17, and can therefore stabilize the cavities 22.

Figure 6:
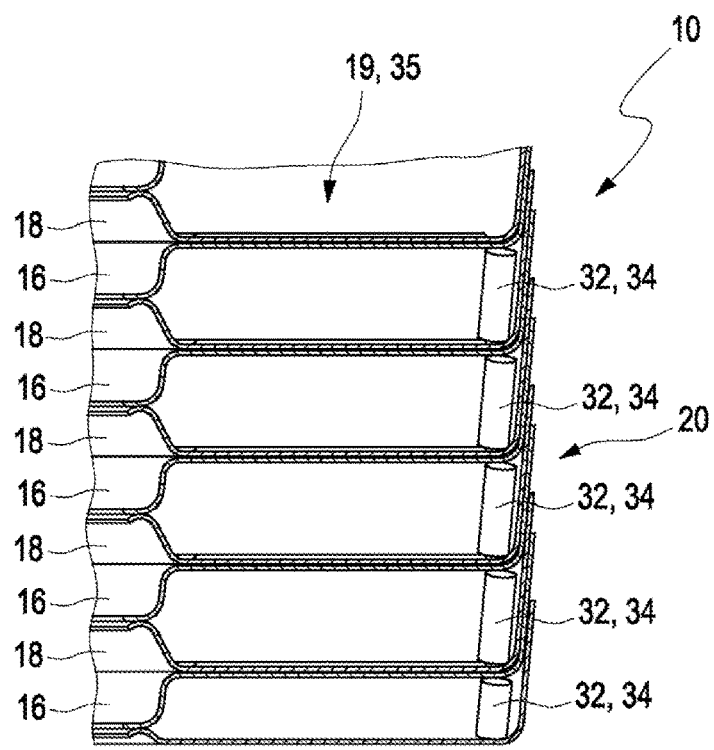

As is illustrated by way of example in FIG. 6, the support structure 32 can be formed by multiple insert parts 34, which owing to their extent in stacking direction 12 prevents too intensive a pushing together of the stacked plates 14 in stacking direction 12. Thereby, the distance between the stacked plates 14 and therefore the second cavities 26 in the region of the second openings is stabilized.

Preferably, the insert parts 34 are configured cylindrically. Such cylindrical insert parts are very simple to produce and thereby form a favourably priced support structure.

Preferably multiple, for example eight, insert parts 34 are provided for each pair of stacked plates 14. Here, respectively four insert parts are arranged in each of the end regions of the stacked-plate heat exchanger 10.

Figure 7:
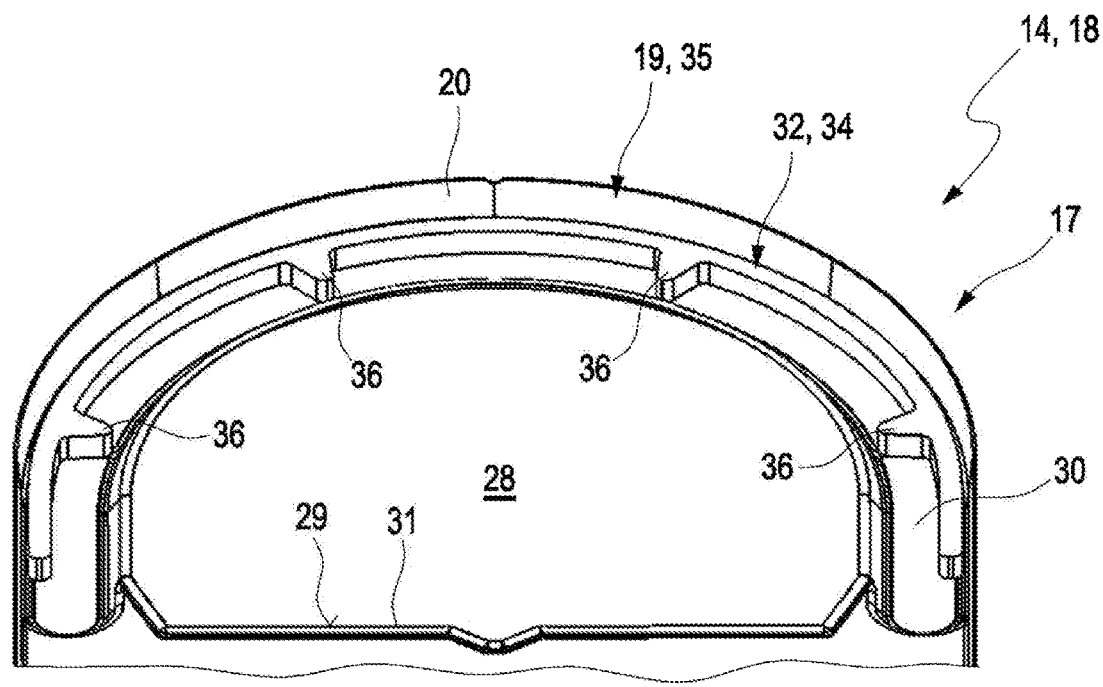
Figure 8:
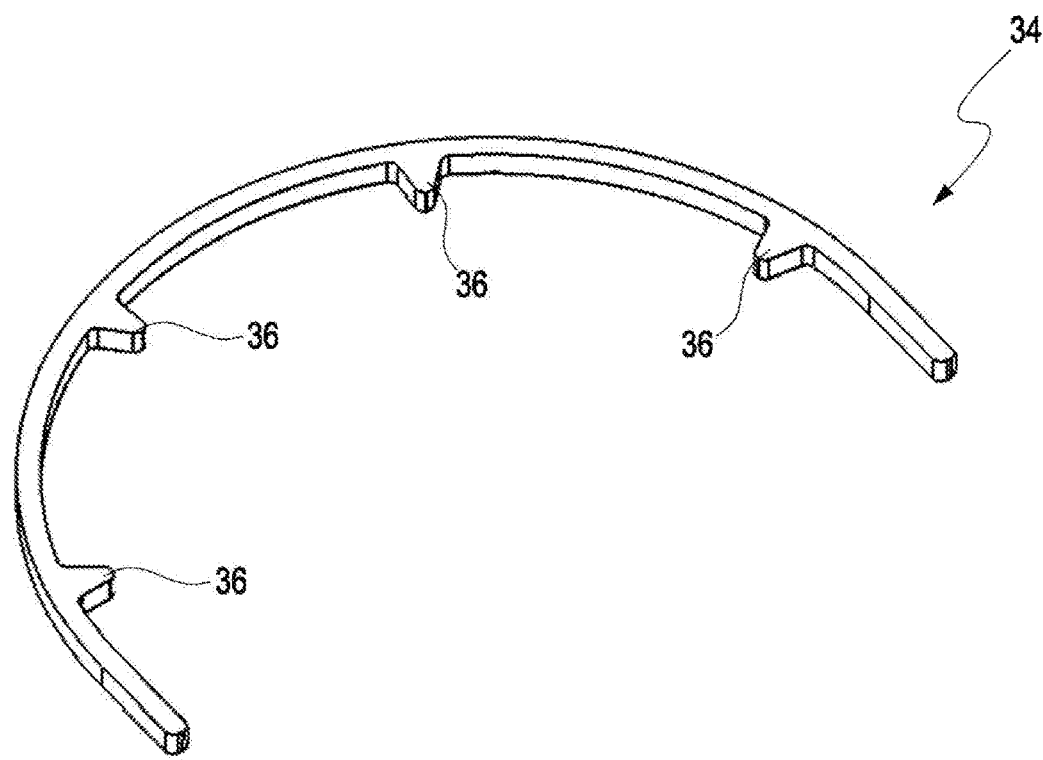

A second embodiment of the stacked-plate heat exchanger 10 illustrated in FIGS. 7 and 8 differs from the first embodiment of the stacked-plate heat exchanger 10 illustrated in FIGS. 1 to 6 in that the support structure 32 is formed having half-ring-shaped insert parts 34 with a plurality of inwardly projecting fingers 36. Here, the support structure 32 has two insert parts 34 for each pair of stacked plates 14, therefore one insert part 34 for each end region. Through the semi-circular shape of the insert parts 34, the position of the insert parts 34 within the second cavity 26 is stable, so that the insert parts 34 can support the stacked plates 14 against one another well.

The inwardly extending fingers 36 of the insert parts 34 bring about, on the one hand, a segmenting of the second opening 30. On the other hand, the position of the insert parts 34 within the stacked plates 14 is further established.

Otherwise, the second embodiment of the stacked-plate heat exchanger 10 illustrated in FIGS. 7 and 8 conforms to the first embodiment of the stacked-plate heat exchanger 10 illustrated in FIGS. 1 to 6 with regard to structure and function, the above description of which is referred to in this respect.

Figure 9:
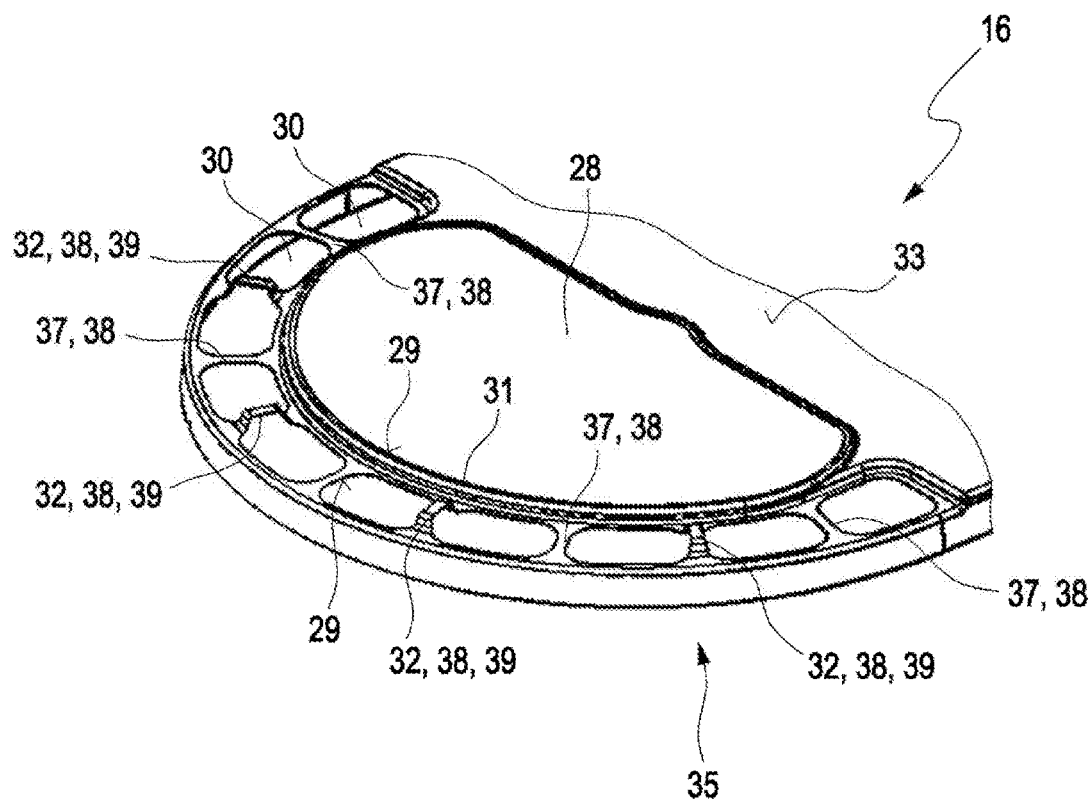
Figure 10:
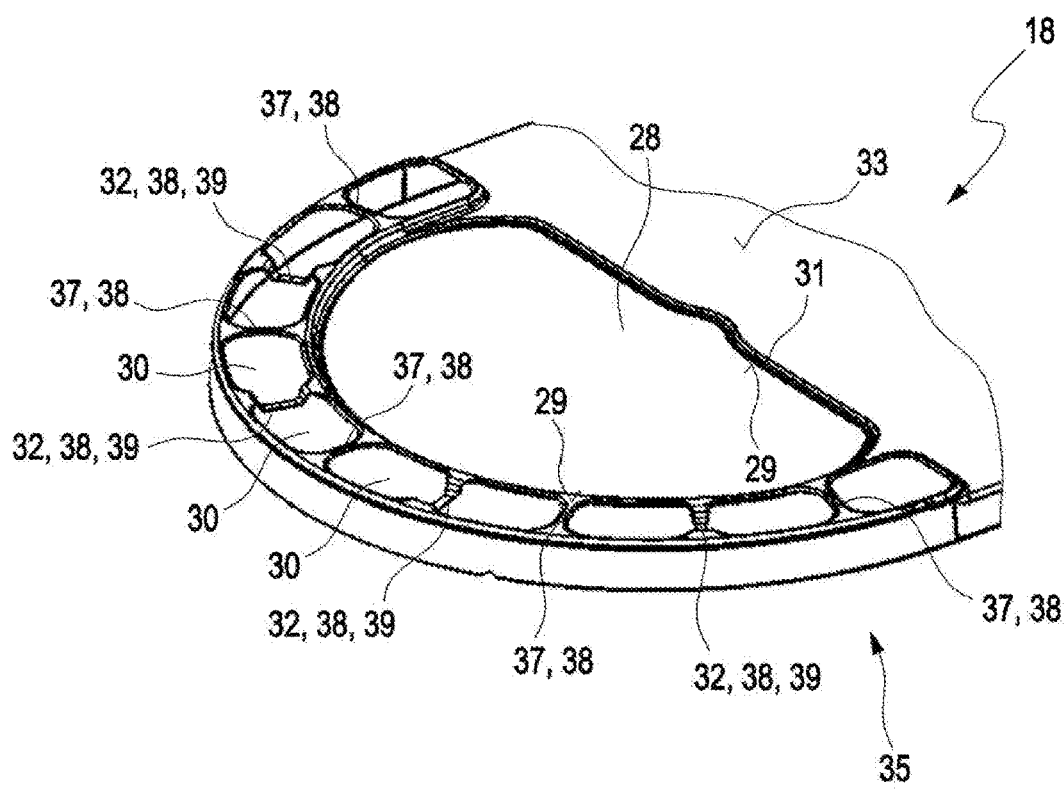
Figure 11:
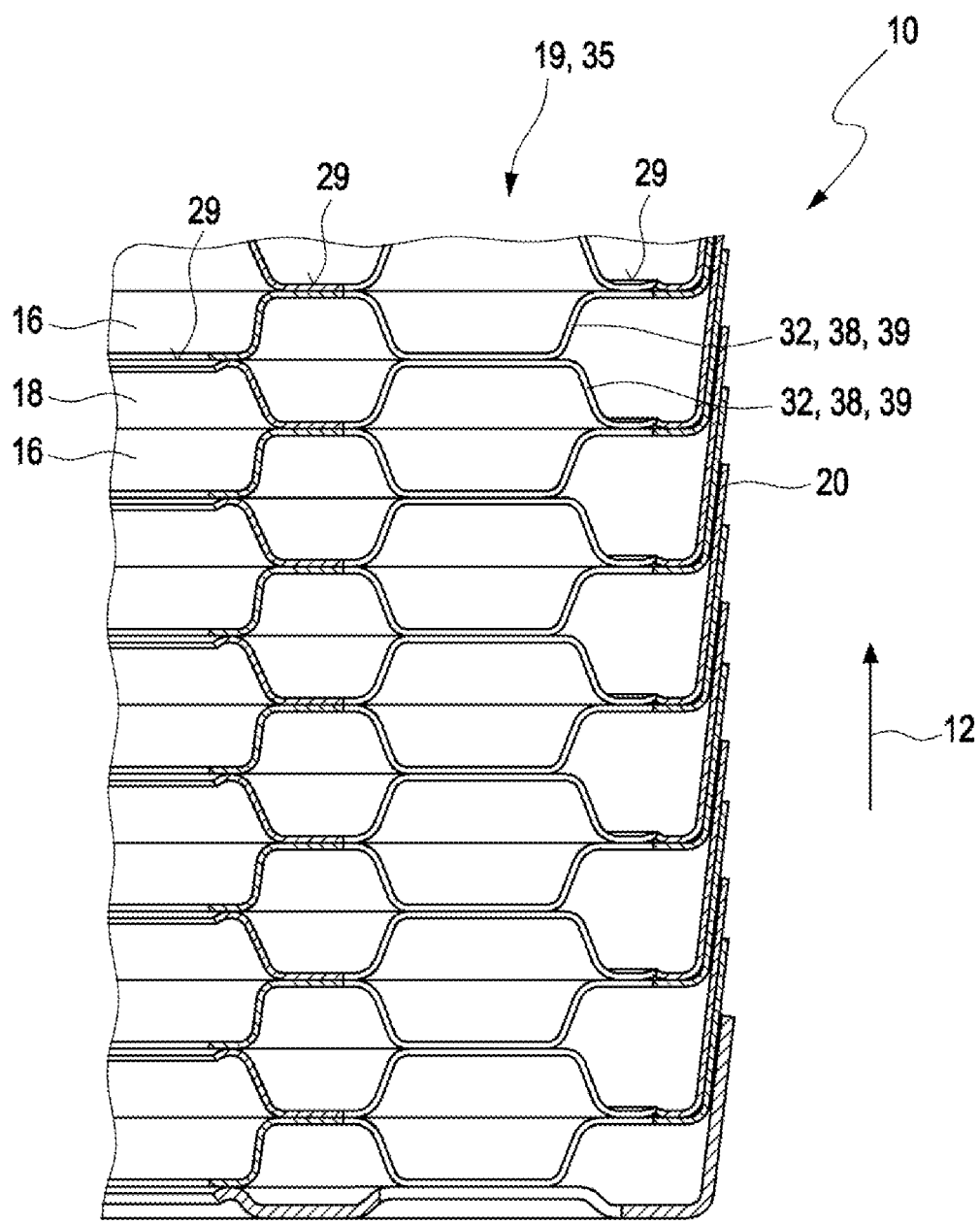

A third embodiment of the stacked-plate heat exchanger 10 illustrated in FIGS. 9 to 11 differs from the first embodiment of the stacked-plate heat exchanger 10 illustrated in FIG. 1 to 6 in that the stacked plates 14 have multiple second openings 30, which are separated from one another by webs 38 and in that the support structure 32 is formed by stamped webs 39 between the second openings 30. Stamped webs 39 and non-stamped webs 37 are arranged alternately. The stamped webs 39 are stamped such that they project into the subsequently formed second cavity 26. Thereby, the stamped webs 39 of the first stacked plate 16 and of the second stacked plate 18 can mutually support against one another. Through the fact that stamped webs 39 and non-stamped webs 37 are provided, the stacked plates 14 can support themselves against the adjacent stacked plates 14 in both directions in the region 19 of the at least one second opening 30.

Otherwise, the third embodiment of the stacked-late heat exchanger 10 illustrated in FIGS. 9 to 11 conforms, with regard to structure and function, to the first embodiment of the stacked-plate heat exchanger 10 illustrated in FIGS. 1 to 6, the above description of which is referred to in this respect.

Figure 12:
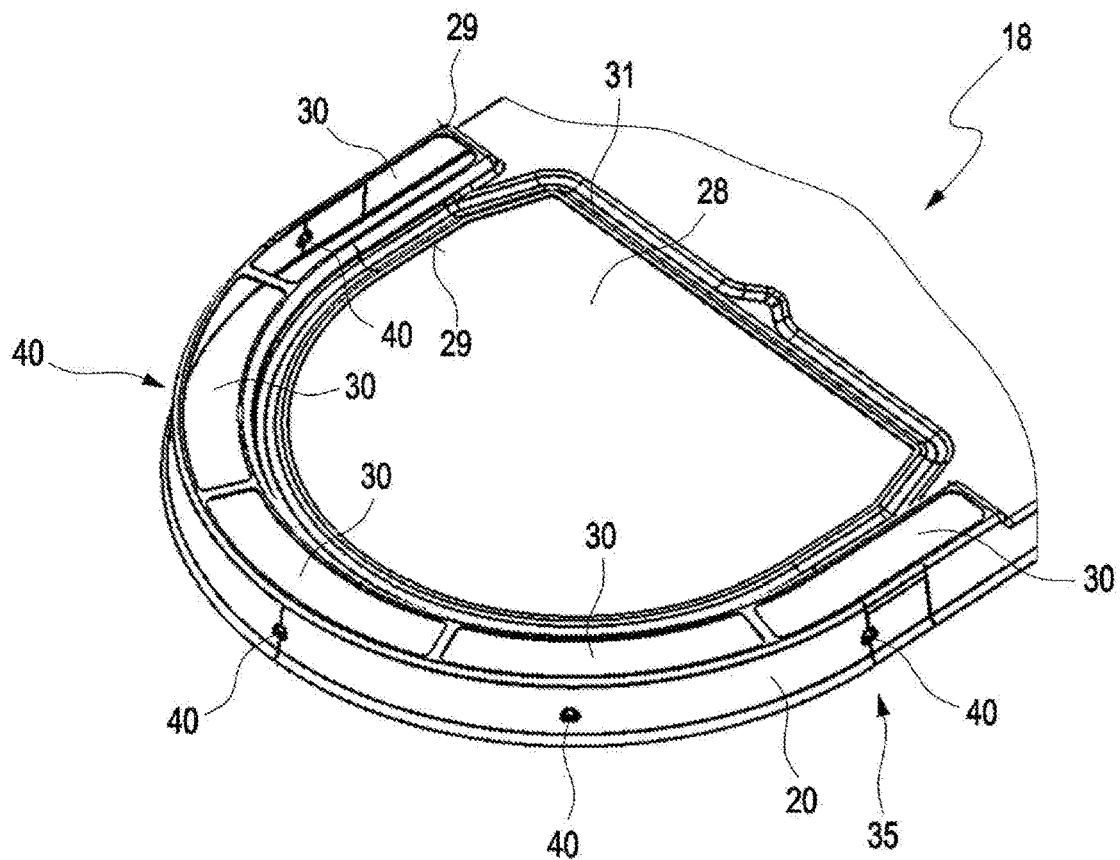
Figure 13:
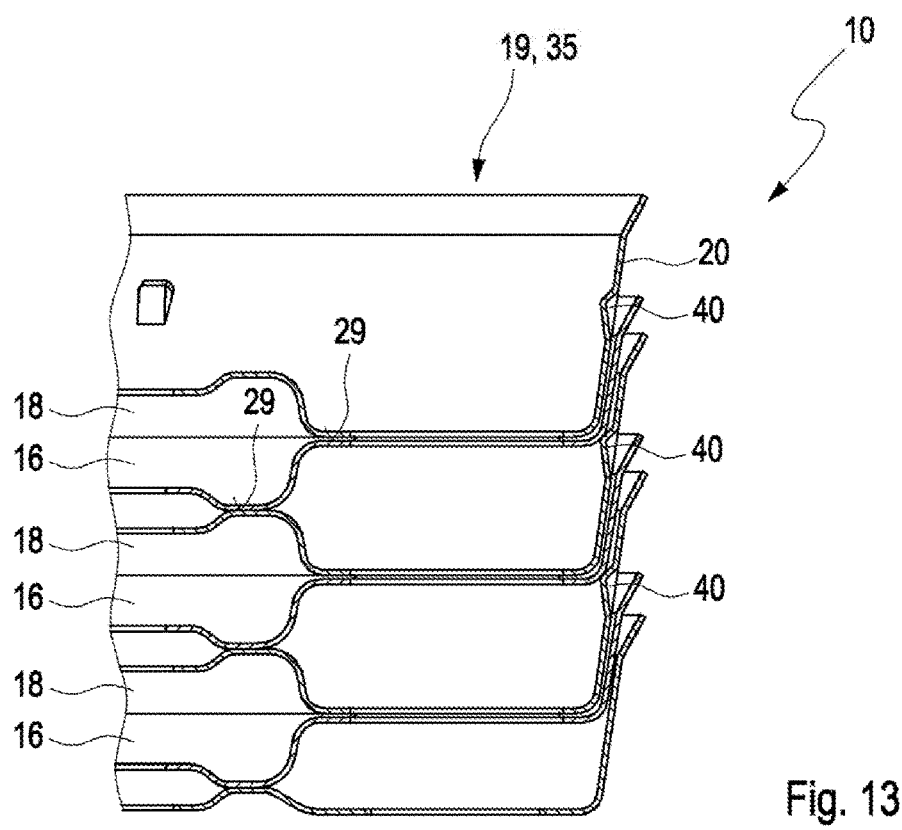

A fourth embodiment of the stacked-plate heat exchanger 10 illustrated in FIGS. 12 and 13 differs from the third embodiment of the stacked-plate heat exchanger 10 illustrated in FIGS. 9 to 11 in that the support structure 32 is formed by multiple, preferably five, cams 40 introduced into the rim 20 of the second stacked plates 18. The cams 40 are preferably directed inwards.

The first stacked plates 16, which are arranged over the second stacked plates 18, can therefore be supported by the cams 40. Thereby, the distance between the stacked plates 14 in the region of the second opening 30 is stabilized by the cams 40.

Otherwise, the fourth embodiment of the stacked-plate heat exchanger 10 illustrated in FIGS. 12 and 13 conforms to the third embodiment of the stacked-plate heat exchanger 10 illustrated in FIGS. 9 to 11 with regard to structure and function, the above description of which is referred to in this respect.

The invention claimed is:

1. A stacked-plate heat exchanger, comprising:
   a plurality of stacked plates stacked one on top of another;
   wherein the plurality of stacked plates include a plurality of first stacked plates and a plurality of second stacked plates stacked alternately one on top of another in a stacking direction;
   wherein each of the plurality of stacked plates includes a rim disposed around a periphery and extending in the stacking direction;

wherein the rim of each of the plurality of stacked plates lies against the rim of an adjacent stacked plate of the plurality of stacked plates;

wherein pairs of adjacent stacked plates each delimit one of a first cavity for the passage of a first fluid and a second cavity for the passage of a second fluid, such that the pairs of adjacent stacked plates respectively define the first cavity and the second cavity in an alternating manner in the stacking direction;

wherein a support structure mutually supports the plurality of stacked plates in an edge region of the plurality of stacked plates to stabilize the second cavity;

wherein the plurality of stacked plates each has an end region disposed in a longitudinal direction that includes a first opening for the first fluid and a plurality of second openings, arranged around the first opening, for the second fluid;

wherein the support structure and at least a portion of the second cavity are arranged in a region of the plurality of second openings;

wherein at least some of the plurality of stacked plates include a plurality of webs, each web of the plurality of webs arranged between two adjacent second openings of the plurality of second openings; and wherein the plurality of webs includes a plurality of stamped webs that project into the second cavity and lie against a stamped web of the adjacent stacked plate to form the support structure;

wherein the plurality of stacked plates each have a stamped portion protruding therefrom in the stacking direction, the stamped portion at least partially surrounding the first opening;

wherein the plurality of second openings are disposed in the stamped portion; and wherein the plurality of webs further include a plurality of unstamped webs that lie against an unstamped web of another adjacent stacked plate of the plurality of stacked plates.

2. The stacked-plate heat exchanger according to claim 1, wherein the plurality of stacked plates are formed such that a stacked plate of the plurality of stacked plates, in the region of the plurality of second openings, has a distance from a first adjacent stacked plate of the plurality of stacked plates and lies against a second adjacent stacked plate of the plurality of stacked plates that is disposed on an opposite side of the stacked plate.

3. The stacked-plate heat exchanger according to claim 2, wherein the distance from the stacked plate to the first adjacent stacked plate is defined by the support structure.

4. A charge air cooler, comprising a stacked-plate heat exchanger according to claim 1, wherein:
the first fluid is charge air of a charging arrangement and is directed through the first cavity; and
the second fluid is a cooling medium and is directed through the second cavity.

5. An internal combustion engine, comprising a charging arrangement and a charge air cooler according to claim 4, wherein charge air of the charging arrangement is cooled by the charge air cooler.

6. The stacked-plate heat exchanger according to claim 1, wherein the first cavity is fluidically sealed independently of the support structure.

7. The stacked-plate heat exchanger according to claim 1, wherein the support structure is structured separately and independently from the rim of each of the plurality of stacked plates.

8. The stacked-plate heat exchanger according to claim 1, wherein the plurality of webs are each defined by a section of the stamped portion disposed between the two adjacent second openings.

9. The stacked-plate heat exchanger according to claim 1, wherein the plurality of stamped webs project from the stamped portion.

10. The stacked-plate heat exchanger according to claim 1, wherein:
the stamped portion of each of the plurality of first stacked plates protrudes therefrom in a first direction;
the plurality of stamped webs of each of the plurality of first stacked plates project from the stamped portion in a second direction opposite the first direction;
the stamped portion of each of the plurality of second stacked plates protrudes therefrom in the second direction; and
the plurality of stamped webs of each of the plurality of second stacked plates project from the stamped portion in the first direction.

11. The stacked-plate heat exchanger according to claim 1, wherein:
the stamped portion of each of the plurality of stacked plates protrudes therefrom a first distance;
the plurality of stamped webs project from the stamped portion a second distance; and
the first distance is equal to the second distance.

12. The stacked-plate heat exchanger according to claim 1, wherein:
the plurality of stamped webs and the plurality of unstamped webs are arranged around the first opening in an alternating manner; and
the plurality of unstamped webs extend between the two adjacent second openings offset from the plurality of stamped webs relative to the stacking direction.

13. The stacked-plate heat exchanger according to claim 1, wherein only a portion of each of the plurality of stamped webs is stamped such that each of the plurality of stamped webs includes a stamped region and an unstamped region.

14. A stacked-plate heat exchanger, comprising a plurality of stacked plates stacked one on top of another, wherein:
the plurality of stacked plates include a plurality of first stacked plates and a plurality of second stacked plates stacked alternately one on top of another in a stacking direction;
each of the plurality of stacked plates includes a rim disposed around a periphery and extending in the stacking direction;
the rim of each of the plurality of stacked plates lies against the rim of an adjacent stacked plate of the plurality of stacked plates;
pairs of adjacent stacked plates each delimit one of a first cavity for the passage of a first fluid and a second cavity for the passage of a second fluid, such that the pairs of adjacent stacked plates respectively define the first cavity and the second cavity in an alternating manner in the stacking direction;
a support structure mutually supports the plurality of stacked plates in an edge region of the plurality of stacked plates;
the plurality of stacked plates each has an end region disposed in a longitudinal direction that includes a first opening for the first fluid and a plurality of second openings for the second fluid;

the plurality of stacked plates each have a stamped portion protruding therefrom in the stacking direction, the stamped portion at least partially surrounding the first opening;

the plurality of second openings are disposed in the stamped portion and are arranged around the first opening;

the plurality of stacked plates each include a plurality of webs, each web of the plurality of webs arranged between two adjacent second openings of the plurality of second openings;

the plurality of webs includes a plurality of stamped webs that project from the stamped portion and lie against a stamped web of the adjacent stacked plate to form the support structure;

the stamped portion of each of the plurality of first stacked plates protrudes therefrom in a first direction;

the plurality of stamped webs of each of the plurality of first stacked plates project from the stamped portion in a second direction opposite the first direction;

the stamped portion of each of the plurality of second stacked plates protrudes therefrom in the second direction; and the plurality of stamped webs of each of the plurality of second stacked plates project from the stamped portion in the first direction.

15. The stacked-plate heat exchanger according to claim 14, wherein:

the stamped portion of each of the plurality of stacked plates protrudes therefrom a first distance;

the plurality of stamped webs project from the stamped portion a second distance; and the first distance is equal to the second distance.

16. The stacked-plate heat exchanger according to claim 14, wherein the support structure is structured separately and independently from the rim of each of the plurality of stacked plates.

17. The stacked-plate heat exchanger according to claim 14, wherein the plurality of webs further include a plurality of unstamped webs that lie against an unstamped web of another adjacent stacked plate of the plurality of stacked plates.

18. A stacked-plate heat exchanger, comprising a plurality of stacked plates stacked one on top of another, wherein:

the plurality of stacked plates include a plurality of first stacked plates and a plurality of second stacked plates stacked alternately one on top of another in a stacking direction;

each of the plurality of stacked plates includes a rim disposed around a periphery and extending in the stacking direction;

the rim of each of the plurality of stacked plates lies against the rim of an adjacent stacked plate of the plurality of stacked plates;

pairs of adjacent stacked plates each delimit one of a first cavity for the passage of a first fluid and a second cavity for the passage of a second fluid, such that the pairs of adjacent stacked plates respectively define the first cavity and the second cavity in an alternating manner in the stacking direction;

a support structure mutually supports the plurality of stacked plates in an edge region of the plurality of stacked plates to stabilize the second cavity;

the plurality of stacked plates each has an end region disposed in a longitudinal direction that includes a first opening for the first fluid and a plurality of second openings, arranged around the first opening, for the second fluid;

the support structure and at least a portion of the second cavity are arranged in a region of the plurality of second openings;

at least some of the plurality of stacked plates include a plurality of webs, each web of the plurality of webs arranged between two adjacent second openings of the plurality of second openings;

the plurality of webs includes a plurality of stamped webs that project into the second cavity and lie against a stamped web of the adjacent stacked plate to form the support structure;

the plurality of stacked plates each have a stamped portion protruding therefrom in the stacking direction, the stamped portion at least partially surrounding the first opening;

the plurality of second openings are disposed in the stamped portion;

the stamped portion of each of the plurality of stacked plates protrudes therefrom a first distance;

the plurality of stamped webs project from the stamped portion a second distance; and the first distance is equal to the second distance.

\* \* \* \* \*